(12) United States Patent
Averbuch et al.

(10) Patent No.: US 8,180,358 B2
(45) Date of Patent: May 15, 2012

(54) JOINING A SESSION IN A COMMUNICATION NETWORK SUPPORTING MULTIMEDIA GROUP CALLS

(75) Inventors: Rod N. Averbuch, Buffalo Grove, IL (US); Mark L. Shaughnessy, Phoenix, AZ (US)

(73) Assignee: Motorola Solutions, Inc., Schaumburg, IL (US)

( * ) Notice: Subject to any disclaimer, the term of this patent is extended or adjusted under 35 U.S.C. 154(b) by 666 days.

(21) Appl. No.: 11/675,186

(22) Filed: Feb. 15, 2007

(65) Prior Publication Data

US 2008/0200157 A1    Aug. 21, 2008

(51) Int. Cl.
*H04W 72/00* (2009.01)

(52) U.S. Cl. ............... 455/452.2; 455/518; 455/519; 455/521; 455/418; 455/450

(58) Field of Classification Search .......... 455/416, 455/418, 450, 518, 519, 521, 452.2
See application file for complete search history.

(56) References Cited

U.S. PATENT DOCUMENTS

| | | | |
|---|---|---|---|
| 6,798,755 B2 * | 9/2004 | Lillie et al. | 370/312 |
| 6,898,436 B2 * | 5/2005 | Crockett et al. | 455/518 |
| 7,130,282 B2 * | 10/2006 | Black | 370/296 |
| 7,536,192 B2 * | 5/2009 | O'Neill | 455/509 |
| 2003/0153340 A1 * | 8/2003 | Crockett et al. | 455/518 |
| 2004/0057420 A1 * | 3/2004 | Curcio et al. | 370/352 |
| 2004/0142706 A1 * | 7/2004 | Kim et al. | 455/458 |
| 2004/0157626 A1 * | 8/2004 | Park et al. | 455/458 |
| 2005/0207340 A1 | 9/2005 | O'Neill | |
| 2005/0272438 A1 * | 12/2005 | Holur et al. | 455/452.2 |

FOREIGN PATENT DOCUMENTS

| | | |
|---|---|---|
| EP | 1435751 A | 7/2004 |
| EP | 1435751 A1 * | 7/2004 |
| EP | 1753166 A | 2/2007 |
| EP | 1753166 A2 * | 2/2007 |

OTHER PUBLICATIONS

Handley, V Jacobson ISI/LBNL M: "SD:: Session Description Protocol; rfc2327.txt" IETF Standard, Internet Engineering Task Force, IETF, CH, Apr. 1, 1998, pp. 1-42.
3GPP Group Services and Systems Aspects: "3GPP TS 23.246 V6.5.0: Multimedia Broadcast/Multicast Service (MBMS) Release 6", 3GPP TS 23.246 V6.5.0, xx, xx, Dec. 1, 2004, pp. 1-44.
Handley Aciri C Perkins USC/ISI E Whelan UCL M: "Session Announcement Protocol; rfc2974.txt", IETF Standard, Internet Engineering Task Force, IETF, CH, Oct. 1, 2000, pp. 1-18.

* cited by examiner

*Primary Examiner* — Nick Corsaro
*Assistant Examiner* — Sowmini Nair
(74) *Attorney, Agent, or Firm* — Brian M. Mancini; Steven A. May

(57) ABSTRACT

An apparatus and method for establishing a session in a communication network supporting multimedia group calls. A first step (202) includes determining streams for a multimedia group call by the service entity. A next step (204) includes providing an indicator of the resources required for at least one stream of the group call by the service entity. A next step (206) includes paging the subscriber unit with the indicator for the at least one stream of the group call by the service entity. A next step (208) includes ascertaining the capabilities and resources of the subscriber unit. A next step (210) includes establishing a channel for only those streams of the group call for which the capabilities and resources of the subscriber unit are sufficient with respect to the indicator for those streams.

16 Claims, 2 Drawing Sheets

JOINING A SESSION IN A COMMUNICATION NETWORK SUPPORTING MULTIMEDIA GROUP CALLS

FIELD OF THE INVENTION

The present invention relates generally to an apparatus and method for enabling a group directed session between a group server and a terminal in a communications system.

BACKGROUND OF THE INVENTION

Multimedia and group communications are becoming more important aspects of telecommunication networks, and the demand for such services will continue to increase. For instance, there are presently many different systems and networks that allow group communication. Public safety organizations are particularly interested in group communications and dedicated resources are being provided for these organizations. Businesses and even personal users also have a desire to use multimedia and group communication. As a result a suite of protocols have already been developed for use in multimedia communications. These protocols are used to control broadcast and interactive communications sessions including data streams such as audio (voice), video, text messaging, and internet protocols, for example between, or to, users (also referred to herein as subscribers) in a communications network. Each subscriber is typically associated with a communications device (also referred to herein as a subscriber unit) that is connected to the communications network.

In practice, a subscriber or dispatcher can set up a multimedia group call with a defined set of users or can allow users to join an existing group call. The multimedia group call consists of establishing a session with different application streams or flows that each represent a different media type, such as voice or video for example. A subscriber attempting, or paged, to join the group call is required to go through session and resource negotiations with a server supporting that session before being able to join the session. This session and resource negotiation requires considerable messaging overhead in the network, which can cause bandwidth and timing problems that are not desirable for sensitive communications, such as in the area of public safety.

In addition, it may be that during the negotiation it is found that the subscriber unit does not have the capability or resources to handle one or more of the different application streams or flows for that group session, whereupon the session can not be completed, wasting all of the previous negotiation messaging. For example, this may occur if the subscriber unit does not have video capability. This may also occur if the subscriber unit is in another session that loads some of its resources, and therefore it is not able to fully participate in the full new group session. This may also occur if the subscriber unit has priority or cost restrictions, and therefore it is not able to fully participate in the full new group session.

Known systems for group communication have implemented a server-centric call control architecture. This architecture may be included in a push-to-talk (PTT) communications system, for example. The architecture includes a service-specific group server, which may be for instance a PTT server, that can be communicatively coupled in the signaling path with a plurality of subscriber units, and optionally a dispatcher, as is known in the art.

The group communication is a session supported by the group server, which is known to subscriber units as the target for all call control signaling. To setup a session, an initiating subscriber unit or dispatcher establishes the group call and its required applications (e.g. voice and video) on the group server. Call control signaling identifies the subscriber units in the group in some manner. These subscriber units are then contacted in a group page by the server, which negotiates with each subscriber unit using a signaling transaction in a separate call leg to join that unit to the session. In addition, other subscriber units can join an established session later through the same negotiation procedure. However, as the number of group members increases, more and more signaling exchanges must be performed over the available communication links before session connection can be completed, if that is even possible for some units with limited resources. For large groups, serialization delays can increase call setup times beyond what is acceptable for certain systems, especially public safety dispatch systems.

Therefore, a need exists for a method and call control architecture that uses less messaging overhead to establish or join a multimedia group session. It would also be of further benefit to identify earlier those subscriber units that do not have sufficient resources for part or all of the group communication session.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF THE PREFERRED EMBODIMENT

Figure 1:
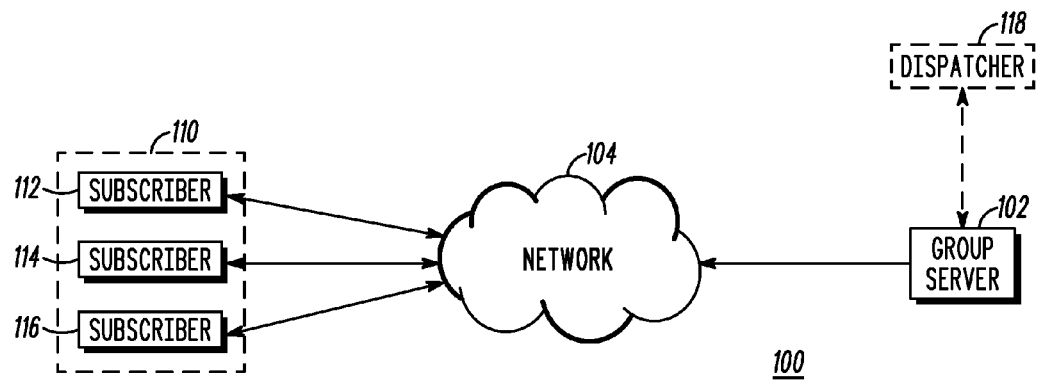
FIG. 1 illustrates a simplified block diagram of a call control architecture in accordance with the present invention.

The present invention provides a method and apparatus that uses less messaging overhead to establish or join a multimedia group session. In addition, the present invention identifies earlier those subscriber units that do not have sufficient resources for part or all of the group communication session. Referring to FIG. 1, the present invention provides for a group communication implemented in a server-centric call control architecture 100. This architecture 100 may be included in a push-to-talk (PTT) communications system, for example. The architecture 100 includes a service-specific service entity (group server) 102, which may be for instance a PTT server, that can be communicatively coupled through a communication network 104 to a plurality of mobile or fixed subscriber units, shown here as three units 112, 114, and 116, and optionally a dispatcher 118.

The group communication is a session supported by the group server 102, which is known to subscriber units 112, 114, and 116 of a group 110 as the target for all call control signaling, as is known in the art. The subscriber units can provide their group affiliation(s) to the server 102, or a subscriber unit could be provisioned with a group affiliation by a service provider, which is communicated directly to the group server 102. To setup a session, an initiating subscriber unit 112 or dispatcher 118 establishes the group call and its required applications on the group server 102. Call control signaling identifies the subscriber units in the affiliated group.

In a group call, the different application streams or flows inside a group session can be accessed by the subscribers in the group. The server 102 establishes what specific application streams (flows) are available or required for the group call. These applications or flows can includes audio (voice), video, text messaging, and internet protocols, for example, each of which require different resources or capabilities in a subscriber unit that participates in the group call. It should be recognized that different subscriber units of the group could have a wide range of resources or capabilities, and some may not be able to participate in the full group session due to such limitations.

The affiliated subscriber units of the group are paged with the group identification (group ID) of the group call in a group page. Alternatively, instead of a single group ID, the group page might contain a list of all subscriber units desired for this call). Ordinarily, the group page contains no other information other than a call is being setup for the invited subscriber units and should be acknowledged, wherein the subscriber units are typically required to go through a negotiation process before deciding to participate, or even if it has the proper resources to participate, in the group call.

In one embodiment of the present invention, the group page includes additional information identifying the resources required to fully participate in the group call. For example, the group page can include data indicating that a group call includes voice and video information requiring specific resources. If a subscriber unit does not want to participate in a video call, or does not have the resources to participate in a video call, the page need not be acknowledged, thereby saving precious messaging overhead in the network. Alternatively, the subscriber unit can choose to only participate in particular flows (e.g. voice) of a partial session, which still requires less messaging overhead since fewer channels need be established with the network.

In a preferred embodiment, the group page includes an indicator of the capabilities required to properly participate in each application of the group call. For example, the group page may provide an indicator that a video application requires a certain data rate or Quality of Service (QoS) level in a subscriber unit for that unit to interact in a group call without latency issues. The indicator(s) can be included in an additional or existing header of the group page message. Moreover, it can be predetermined between the group server and its group that a particular position in the header relates to a particular type of application stream. For example, an indicator in a first position of the header can indicate a required QoS level need to receive an audio portion of a group call, an indicator in a second position of the header can indicate a required QoS level need to receive a video portion of a group call, etc.

A subscriber unit receiving the group page containing the application streams, and possibly a service level indicator for each associated application stream, can examine its current resources and capabilities at that time to determine if its resources and capabilities can properly deal with that particular application of the group session. If so, the subscriber unit can decide to receive the broadcast of the full group session. If not, the subscriber unit can choose to participate in only those flows (e.g. voice only) where it has the required resources and capabilities, at that time. Alternatively, the subscriber unit can choose not to join the call at all.

If a subscriber unit decides to partially participate, the subscriber unit will indicate to the network and server the particular group session ID number and the specific flows for which it is able or interested in participating, whereupon the server can establish a unicast link for the specific flows that currently can be supported by the subscriber unit while broadcasting the entire group session to those of the group that are not limited in resources. Alternatively, the server can establish one group application session with the available streams defined within it and the subscriber unit can choose to receive only those identified streams for which it has resources.

It should be noted that the resources and capabilities of a subscriber unit can change dynamically. For example, a subscriber unit could be participating in another session which consumes some of its resources, and therefore could not fully participate in the new group call. In this way, the subscriber unit's resources could be split between the two separate group sessions (e.g. watching audio and video from one session, while waiting for a fax from another session). In another example, subscriber capability could also be limited by the current coverage of the device or impacted by the current load (presentation) that temporarily and dynamically limits subscriber capability. In yet another example, subscriber capability could also be limited by task priority or cost restrictions due to a defined roaming or billing plan.

In another embodiment of the present invention, a subscriber unit with limited resources can negotiate with the group server to provide a "store & forward shaping" function, wherein the group server can reduce the bandwidth or data rate of a particular stream to be unicast to the subscriber unit. In this way, the subscriber unit can still receive a degraded portion of a particular application stream instead of eliminating that stream entirely. This type of negotiation can require increased signaling overhead. Therefore, it is preferred that the group server examine those subscriber units in the group that are requesting reduced services, and determine if there is a common capability or resource limitation amongst a defined subgroup of subscriber units which the group server can use to set up a common unicast to deliver for just that subgroup. For example, the group server can provide video content at a lower data rate to be properly received in those subscriber units of a subgroup having a common QoS level capability. In particular, for the common unicast, the degraded stream can be given an identifier, either a separate actual IP address or port, or some other stream header identifier if sent to the same IP address and port, that the subgroup can decode as stream content that is intended for them only.

Figure 2:
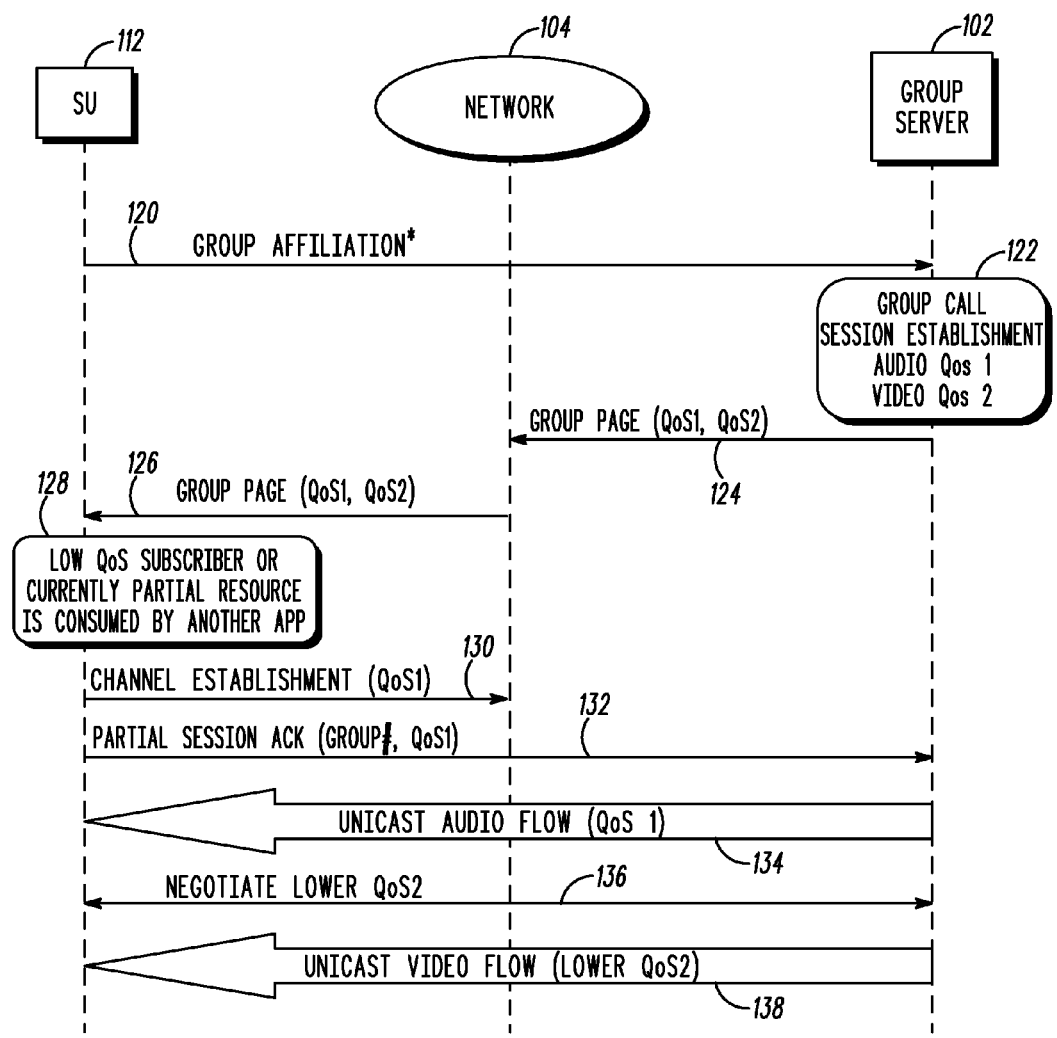
FIG. 2 illustrates a simplified flow diagram for an embodiment of the present invention.

FIG. 2 illustrates a call control flow between a number of entities and their communication paths for enabling communications in a communications network 104 between a service entity 102 (group server) and a subscriber unit 112 (SU) in a communications system, in accordance with a the present invention. In particular, the call flow demonstrates how a subscriber unit joins a group call. Each SU 112 typically comprises a logical entity, e.g., a user, and a physical counterpart, e.g., a terminal, as part of a group entity (110 of FIG. 1) that is named and addressable at the application layer. The preferred transactional broadcast protocol is Session Announcement Protocol (SAP). However, it should be recognized that obvious variations of the present invention could be utilized in protocols such as Session Initiation Protocol (SIP) and Session Description Protocol (SDP), for example.

The diagram is simplified for purposes of illustrating the present invention. However, those of ordinary skill in the art will realize that many other network entities may be part of the communication system. For example, the group server 102 can include many other entities which have not been shown for the sake of simplicity. For example, the group server can include one or more of a session controller, a group database manager, a registration manager, an application layer router, a group entity manager, a broadcast and unicast address manager, a policy manager, a floor controller, a media manager, and a bandwidth manager, among others, all of which are known in the art. It should be appreciated that the above described entities can be integrated in the same physical or logical network element (i.e. group server), or provided as separate physical or logical network elements.

Prior to establishing a group communication between or from a group server 102 and a subscriber unit 112, the group server may know the group affiliation of the subscriber unit. In the example shown, the subscriber unit 112 provides 120 this information to the group server 102. Alternatively, a subscriber unit could be provisioned with a group affiliation by a service provider, which is communicated directly to the group server 102 by the service provider (not shown). In another alternatively, the group affiliation could be selected by the user of subscriber unit 112, and the group server 102 would learn about that affiliation when the subscriber unit generates or responds to a group request. For example, a user might learn of the existence of a group (and thus the group's ID) outside of the system (by newsletter, email, etc.), and decide to join it at some point in time later, simply by setting his subscriber device to start responding to that group's ID. This would support, for example, a user deciding on-the-fly to join a weekly TV show or a daily informational broadcast.

A subscriber unit or dispatcher (not shown) can request and initiate a group session using protocols known in the art. Upon receiving a session request, the group server 102 may be preferably configured for determining the set of subscriber units to pull into a session based on the received group affiliation information. In general, a group session has members that may, or may not, be known a priori. Such knowledge is not required in advance if the group ID is understood by all members when the session request is received by them. In accordance with the present invention, the group server also establishes the operating parameters for each application stream or flow of the group call and calculates the resources and/or capability requirements for group members to properly interact in the group call. For example, the group session being established may be a multimedia broadcast involving audio and video. In this case, the group server can calculate a minimum QoS level for both the audio and video streams, QoS1 and QoS2, respectively, as shown 122. Alternatively, the resource or capability requirements may involve other signaling or receiving parameters other than QoS, such as minimum data rate, minimum buffer size, minimum error rate, maximum latency limit, minimum SIR, audio codecs, video codecs, screen size, support for broadcast, and the like, all of which are contemplated in the present invention.

If the group server grants the request for a new session, the group server 102 signals the session setup for that group ID to the subscriber units 112 through the network 104 either through a SAP INVITE message, for example, or group page (as shown). In accordance with the present invention, the group page includes service level indicators of the resources and/or capabilities needed by the subscriber units to receive each application stream. In the example shown 124, 126, the group page includes minimum QoS levels needed to receive an audio stream (QoS1) and a video stream (QoS2) of a multimedia broadcast. This group page message is sent 124 from the group serve 102 to the network 104, which forwards 126 the group page to the subscriber unit 112 using the appropriate communication protocol.

In a preferred embodiment, the indicators such as QoS1 and QoS2 are included in an additional or existing header of the group page message. More preferably, it is pre-established between the group server and its group that a particular position in the header relates to a particular type of application stream. In the example shown, an indicator (e.g. QoS1) in a first position of the header can indicate a required QoS level need to receive an audio portion of a group call, an indicator (e.g. QoS2) in a second position of the header can indicate a required QoS level need to receive a video portion of a group call, etc. This reduces signaling overhead. Alternatively, the indicator and an identity of its associated application stream can be included in the header.

The subscriber unit 112 receives the group page with the service level indicators for each application stream and ascertains 128 whether it has the resources and/or capabilities to properly receive the broadcast for that group. If the subscriber has the proper resources to meet all the streams of the call, then the subscriber unit can join in the group session using the known procedures. However, if the subscriber unit has limited resources, due to low static QoS capabilities, dynamic changes to resource loading resulting in only partial current resources, task priorities, conflict with other sessions or applications, cost restrictions, and the like, the subscriber unit can decide to ignore the page or to partially participate in the group session.

In the example shown, the subscriber unit ascertains that it has limited resources and can only properly receive the audio portion of the broadcast at the specified QoS1 level. In this event, the subscriber unit establishes 130 an audio only channel with the network. The subscriber unit also acknowledges 132 to the group server that it can only partially participating in the call for the identified group ID, and identifies which stream it wants to receive by sending back those indicators (QoS1) of the stream it wants. It should be recognized that other pre-agreed upon indicators can be sent other than QoS1. The group server can respond by sending 134 a separate unicast of only the audio portion (QoS1) to that subscriber unit. Alternatively, the group server can ignore the request 132. In another embodiment if the group call involves an application session with defined streams, the subscriber unit can acknowledge the page and choose for itself what streams it wants to receive.

Another way for the subscriber unit to partially participate in the group session is to negotiate 136 with the group server to establish a lower quality stream (lower QoS2) for unicast to it and other similarly resource-limited subscribers, as detailed above. The group server can reduce the bandwidth or data rate of a particular stream (QoS2) to be unicast 138 to the subscriber unit. In this way, the subscriber unit can still receive a degraded portion of a particular application stream instead of eliminating that stream entirely.

Figure 3:
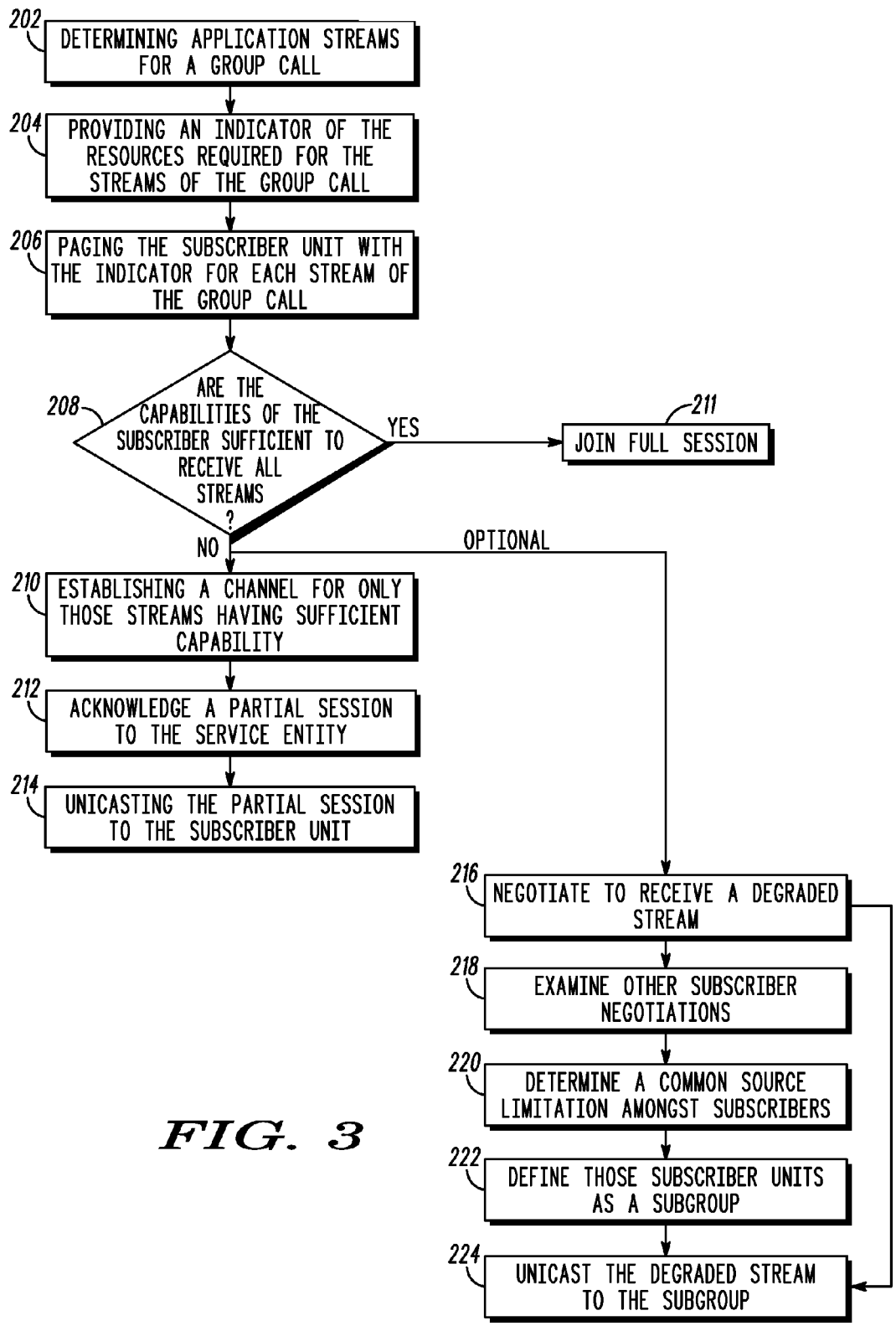
FIG. 3 illustrates a method in accordance with the present invention.

FIG. 3 illustrates a method for joining a session in a communication network supporting multimedia group calls. The method includes a first step 200 of determining a plurality of application streams or flows for a multimedia group call by a service entity, such as a is a group server for multimedia group calls. These streams can includes audio, video, text, etc.

A next step 204 includes providing an indicator of the resources required for at least one stream of the group call by the service entity. In particular, the indicator can be a service level indicator, such as a minimum QoS level needed to receive that associate application stream.

A next step 206 includes group paging the subscriber unit(s) with the indicator for the at least one stream of the group call by the service entity. The group page also includes the group ID for that session, and can include the identities of their associated streams of the group call.

A next step 208 includes ascertaining the capabilities and resources of the subscriber unit and whether those capabilities and resources are currently sufficient for receive each of the streams of the multimedia call.

If the capabilities and resources of the subscriber unit are sufficient with respect to all of the indicators for each of the streams of the group call, a next step 211 includes acknowledging and joining the group call.

If the capabilities and resources of the subscriber unit are sufficient with respect to the indicator for only at least one of the streams of the group call, a next step 210 includes establishing a channel for only those at least one streams of the group call. Another step 212 includes acknowledging a partial session to the service entity. The acknowledging step includes sending the group affiliation and the indicator for the at least one stream of the group call. Another step 214 includes unicasting the partial session by the service entity to the subscriber unit.

Optionally, the subscriber unit can further negotiate 216 to receive a degraded stream sufficient to meet the capabilities and resources of the subscriber unit, wherein the service entity can unicast 224 the degraded stream to the subscriber unit if it wants to allocate the necessary additional resources. Additionally, the service entity can examine 218 any other subscriber units negotiating a degraded stream, determine 220 if there is a common resource limitation amongst those subscriber units, define 222 those subscriber units with a common resource limitation as a subgroup, and deliver 224 the degraded stream in a common unicast to the subgroup or just to the negotiating subscriber unit.

The present invention provide the advantages of providing at least partial content to group members which are presently not capable of receiving all of the content properly. In addition, the present invention saves airtime on a cell by supporting temporarily low resource intensive subscriber units.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for joining a session in a communication network supporting multimedia group calls, the method comprising the steps of:
   at a subscriber unit:
   receiving, from a service entity for each stream of a plurality of streams of a multimedia group call, a separate indicator of the resources required for the corresponding stream;
   with respect to each separate indicator, ascertaining whether the subscriber unit has sufficient capabilities and resources to receive the corresponding stream;
   determining a first portion of the plurality of streams for which the subscriber unit has sufficient capabilities and resources with respect to the separate indicators to receive the corresponding streams and a second portion of the plurality of streams for which the subscriber unit does not have sufficient capabilities and resources with respect to the separate indicators to receive the corresponding streams;
   communicating, to the service entity, acceptance of a partial session to receive only the first portion of the plurality of streams of the multimedia group call; and
   establishing a channel with the service entity for receiving only the first portion of the plurality of streams of the multimedia group call.

2. The method of claim 1, wherein each separate indicator identifies a Quality of Service (QoS) level established for the corresponding stream.

3. The method of claim 1, wherein the communicating step further includes sending a group affiliation and the indicator for each stream in the first portion.

4. The method of claim 1, further comprising the step of receiving a unicast of the partial session from the service entity.

5. The method of claim 1, wherein the service entity is a group server for multimedia group calls.

6. The method of claim 1, further comprising negotiating to receive a degraded stream sufficient to meet the capabilities and resources of the subscriber unit.

7. The method of claim 6, further comprising the step of receiving a unicast of the degraded stream.

8. The method of claim 6, further comprising the steps of:
   examining those subscriber units negotiating the degraded stream;

determining if there is a common resource limitation amongst those subscriber units;

defining those subscriber units with a common resource limitation as a subgroup; and delivering the degraded stream in a common unicast to the subgroup.

9. An apparatus for joining a session in a communication network supporting multimedia group calls, the apparatus comprising:

a service entity, the service entity is operable to determine a plurality of streams for a multimedia group call and provide a separate indicator of the resources required for the corresponding stream, the service entity is also operable to page a subscriber unit with the separate indicator for the corresponding stream; and a subscriber unit, the subscriber unit being affiliated with a group, and being operable to ascertain its capabilities and resources with respect to each separate indicator to receive the corresponding stream, operable to determine a first portion of the plurality of streams for which the subscriber unit has sufficient capabilities and resources with respect to the separate indicator to receive the corresponding streams and a second portion of the plurality of streams for which the subscriber unit does not have sufficient capabilities and resources with respect to the separate indicator to receive the corresponding streams, operable to communicate to the service entity, acceptance of a partial session to receive only the first portion of the plurality of streams of the multimedia group call; and operable to establish a channel with the service entity for receiving only the first portion of the plurality of streams of the multimedia group call.

10. The apparatus of claim 9, wherein each separate indicator identifies a Quality of Service (QoS) level established for the corresponding.

11. The apparatus of claim 9, wherein the subscriber unit is further operable to communicate a group affiliation and the indicator for each stream in the first portion.

12. The apparatus of claim 9, wherein the service entity is further operable to unicast the partial session to the subscriber unit.

13. The apparatus of claim 9, wherein the service entity is a group server for multimedia group calls.

14. The method of claim 9, wherein the subscriber unit is further operable to negotiate to receive a degraded stream from the service entity sufficient to meet the capabilities and resources of the subscriber unit.

15. The apparatus of claim 14, wherein the service entity is further operable to unicast the degraded stream to the subscriber unit.

16. The apparatus of claim 14, wherein the service entity is further operable to; examine those subscriber units negotiating a degraded stream, determine if there is a common resource limitation amongst those subscriber units, define those subscriber units with a common resource limitation as a subgroup, and deliver the degraded stream in a common unicast to the subgroup.

* * * * *

UNITED STATES PATENT AND TRADEMARK OFFICE
CERTIFICATE OF CORRECTION

| | | |
|---|---|---|
| PATENT NO. | : 8,180,358 B2 | Page 1 of 1 |
| APPLICATION NO. | : 11/675186 | |
| DATED | : May 15, 2012 | |
| INVENTOR(S) | : Averbuch et al. | |

It is certified that error appears in the above-identified patent and that said Letters Patent is hereby corrected as shown below:

In the Claims:

In Column 10, Line 6, in Claim 10, after "corresponding." insert -- stream. --.

In Column 10, Line 15, in Claim 14, delete "method" insert -- apparatus --, therefor.

Signed and Sealed this
First Day of January, 2013

David J. Kappos
*Director of the United States Patent and Trademark Office*